United States Patent [19]
Vann

[11] Patent Number: 5,813,661
[45] Date of Patent: Sep. 29, 1998

[54] ELECTROMAGNETIC LIFT APPARATUS

[76] Inventor: Ricky Mordecai Vann, P.O. Box 88, Loganville, Ga. 30249

[21] Appl. No.: 800,970

[22] Filed: Feb. 19, 1997

[51] Int. Cl.$^6$ ...................................................... B60S 9/02
[52] U.S. Cl. .............................. 254/418; 254/1; 254/122; 254/DIG. 2; 335/291; 335/294
[58] Field of Search ..................................... 335/291, 294; 254/418, DIG. 2, 122, 1

[56] References Cited

U.S. PATENT DOCUMENTS 4,434,968   3/1984   Smith ........................................... 254/1

*Primary Examiner*—Michael L. Gellner
*Assistant Examiner*—Tuyen T. Nguyen

[57] ABSTRACT

A vehicle mounted electromagnetic jack system attachable to a vehicle for lifting portions or all of a vehicle. The system includes four electromagnetically operated jacks, a main console located within the vehicle, which operates each jack selectively or all collectively for total lift. Each jack consists of a pair of electromagnets proportionately spaced wherein the lifting force is provided by the coupling intensity of the magnetic flux field propagated from each electromagnet, having confronting poles of like polarity, wherein the well-known repelling effect between like magnetic poles urges the poles apart to furnish the lifting force. Current controlled by the Control Panel, located within the vehicle, reverses the current to the Lower Electromagnet, causing a 180° phase shift in the accompanying magnetic flux field, which results in confronting poles of unlike polarity, wherein the well-known attraction effect between unlike poles urges said poles together to furnish the retraction of the electromagnetic jack.

2 Claims, 21 Drawing Sheets

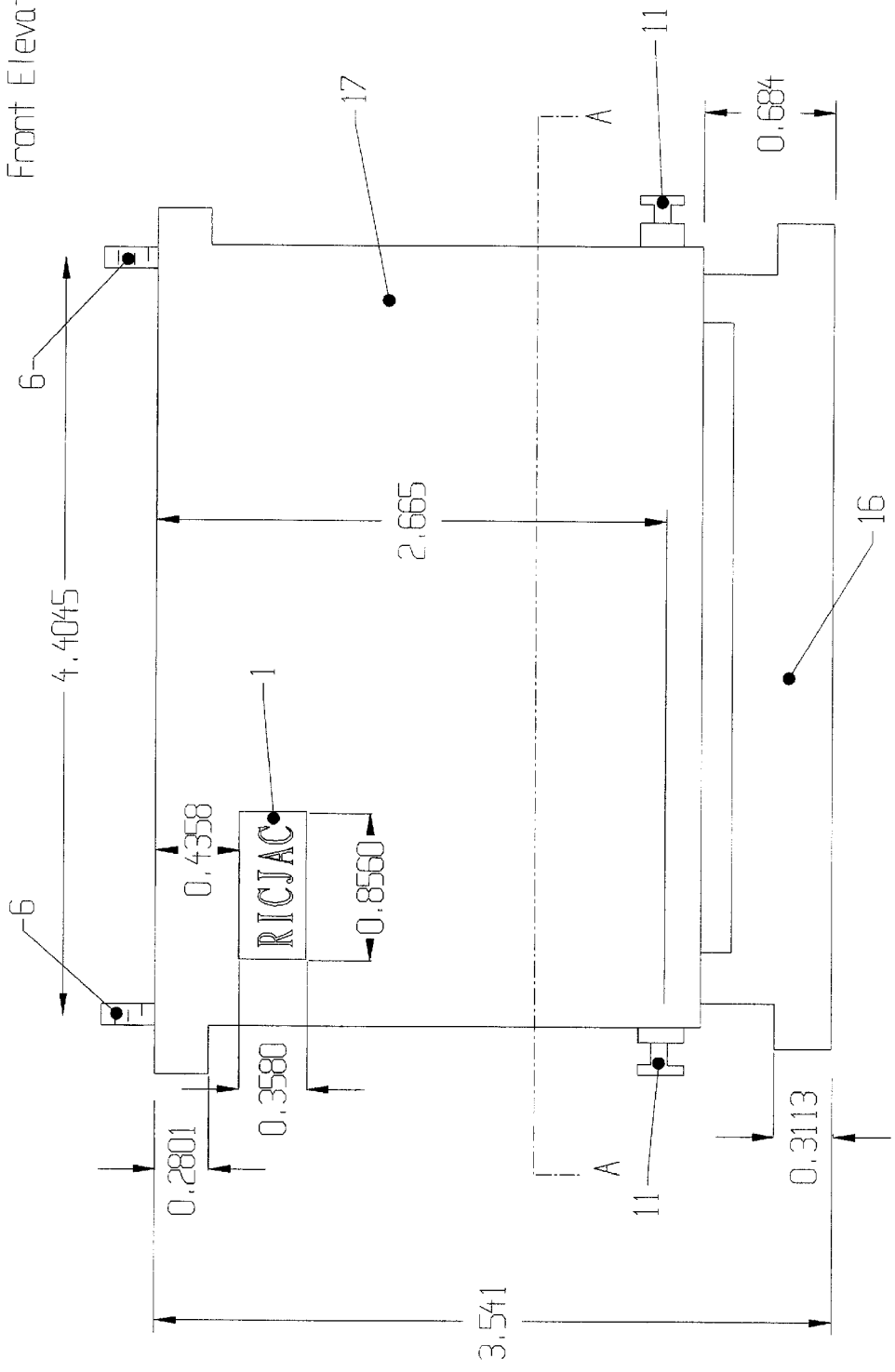

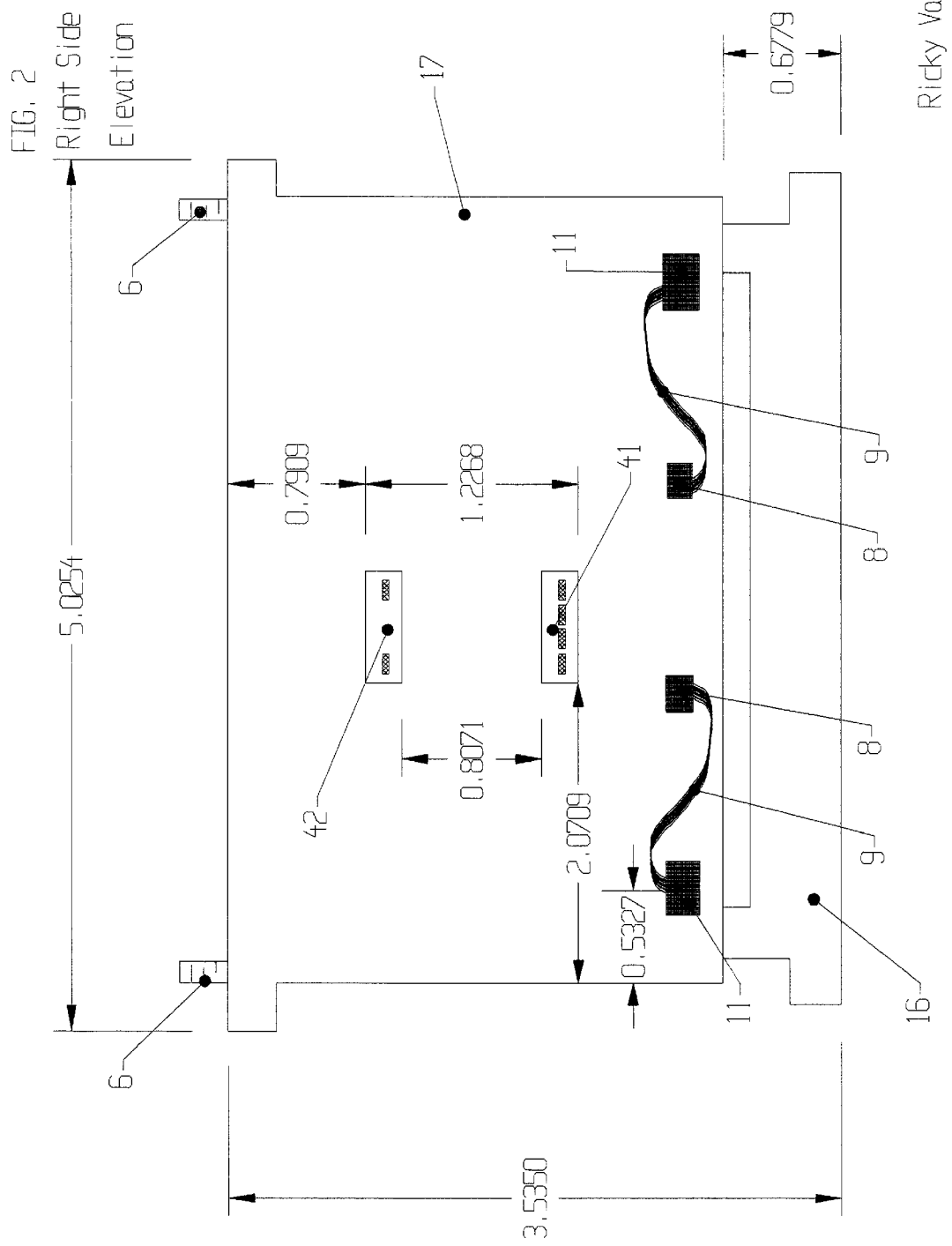

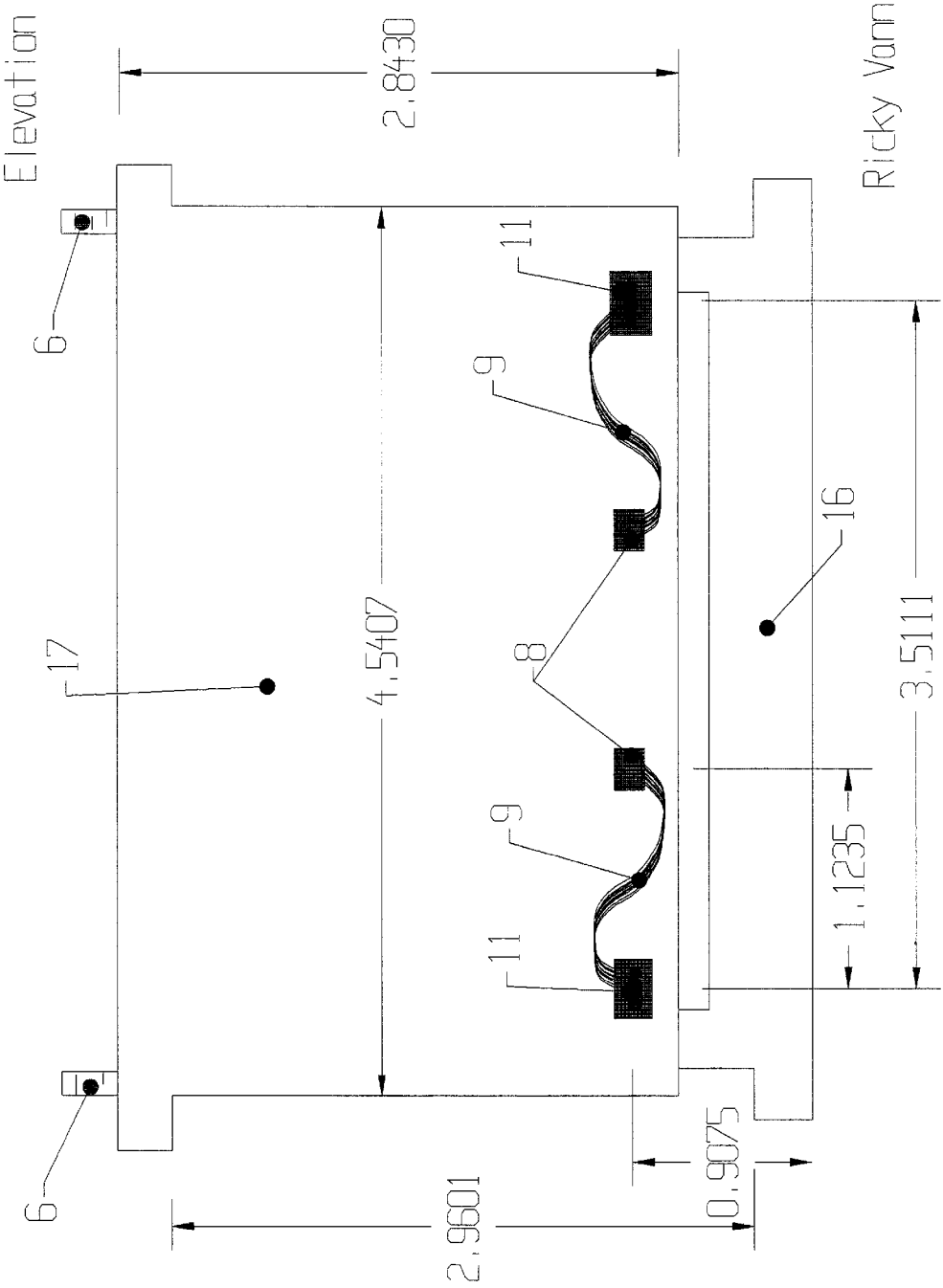

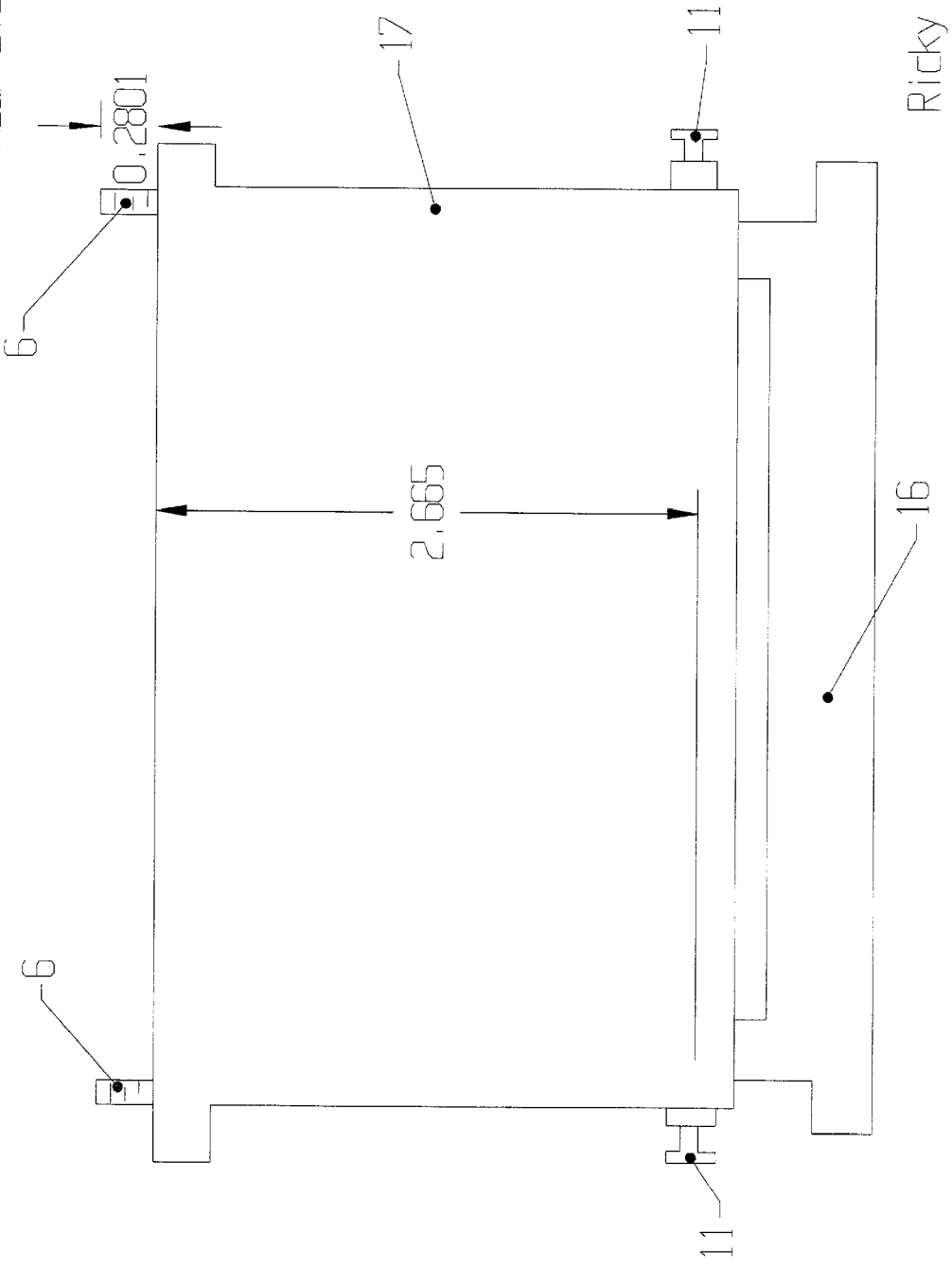

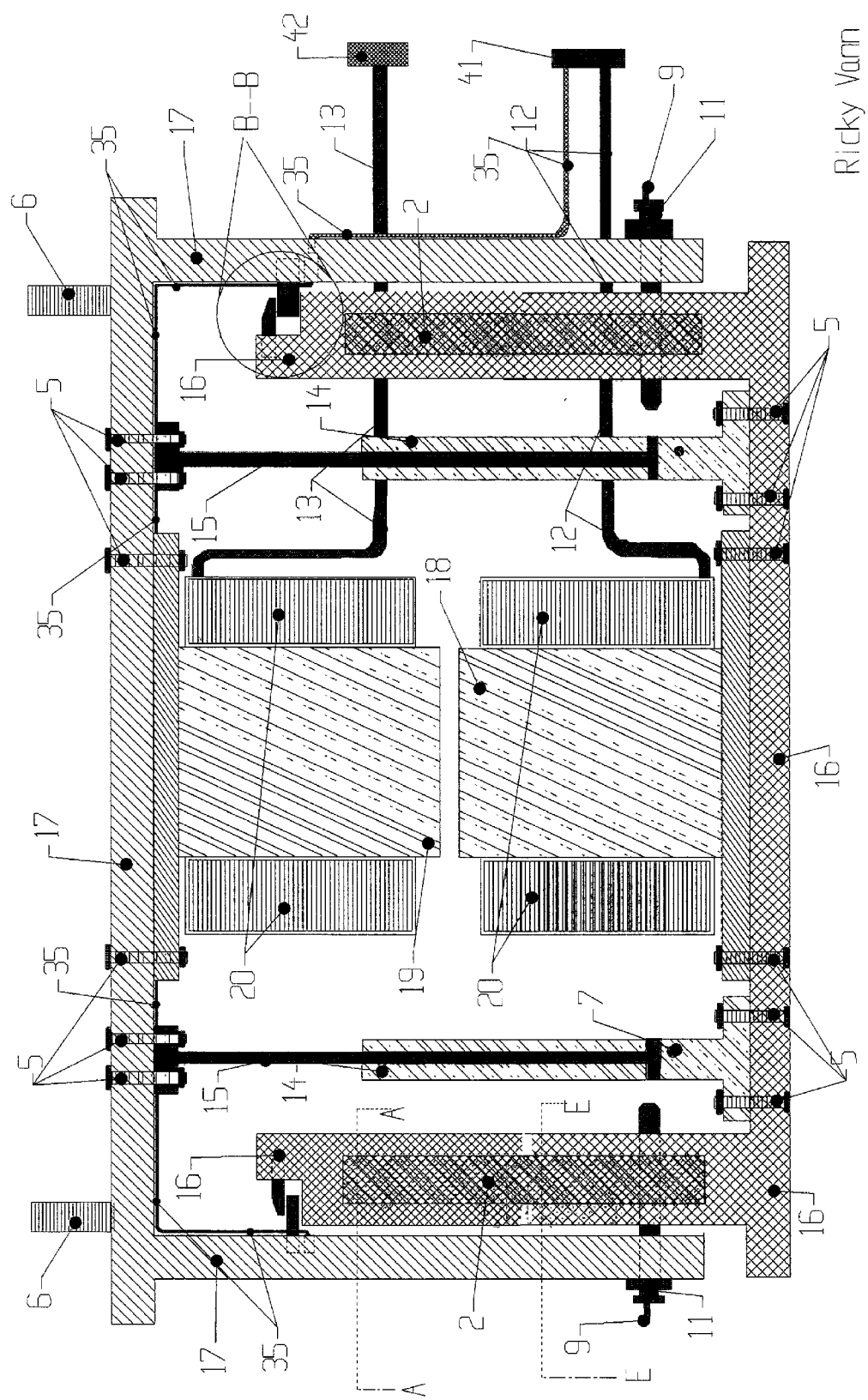

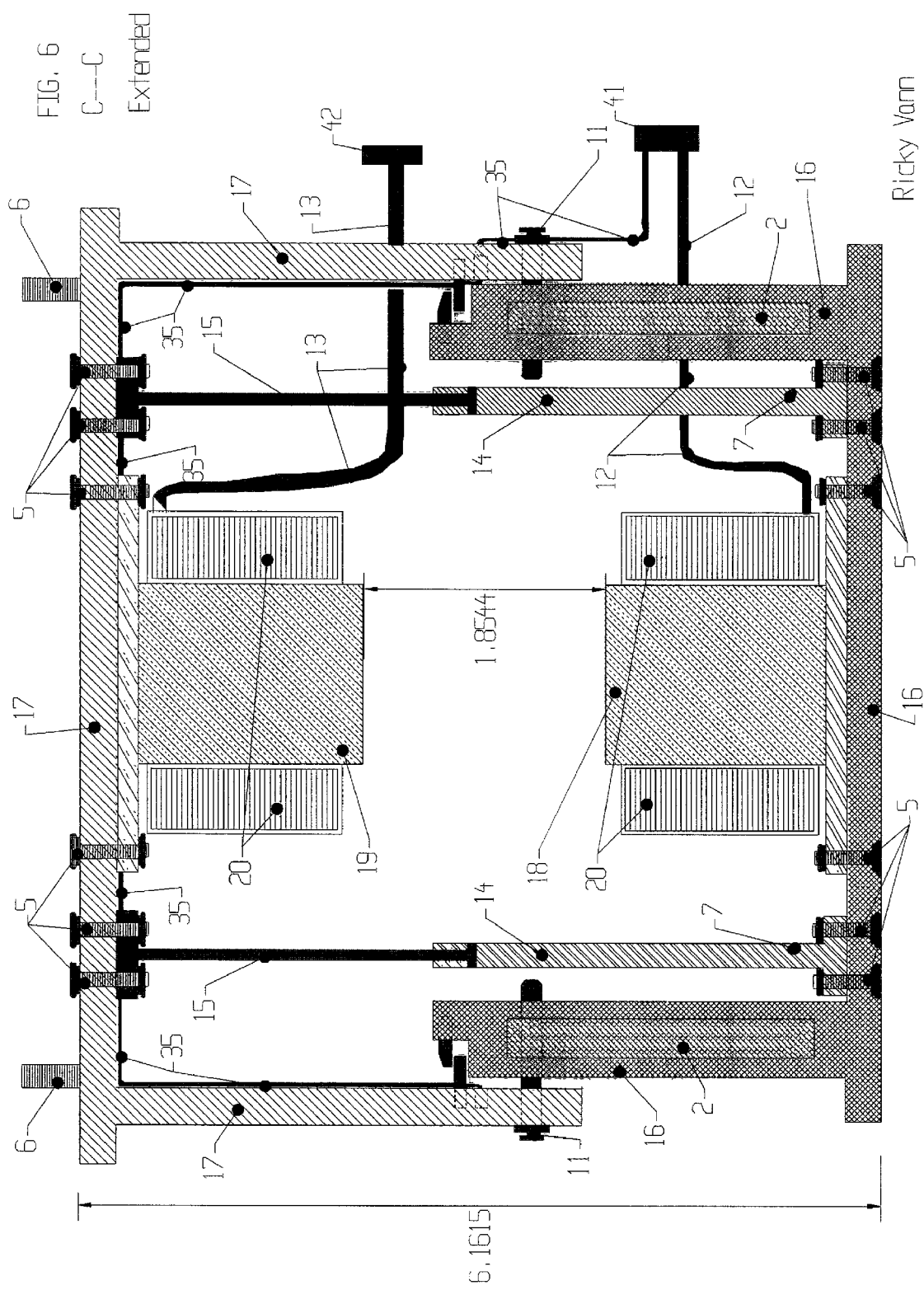

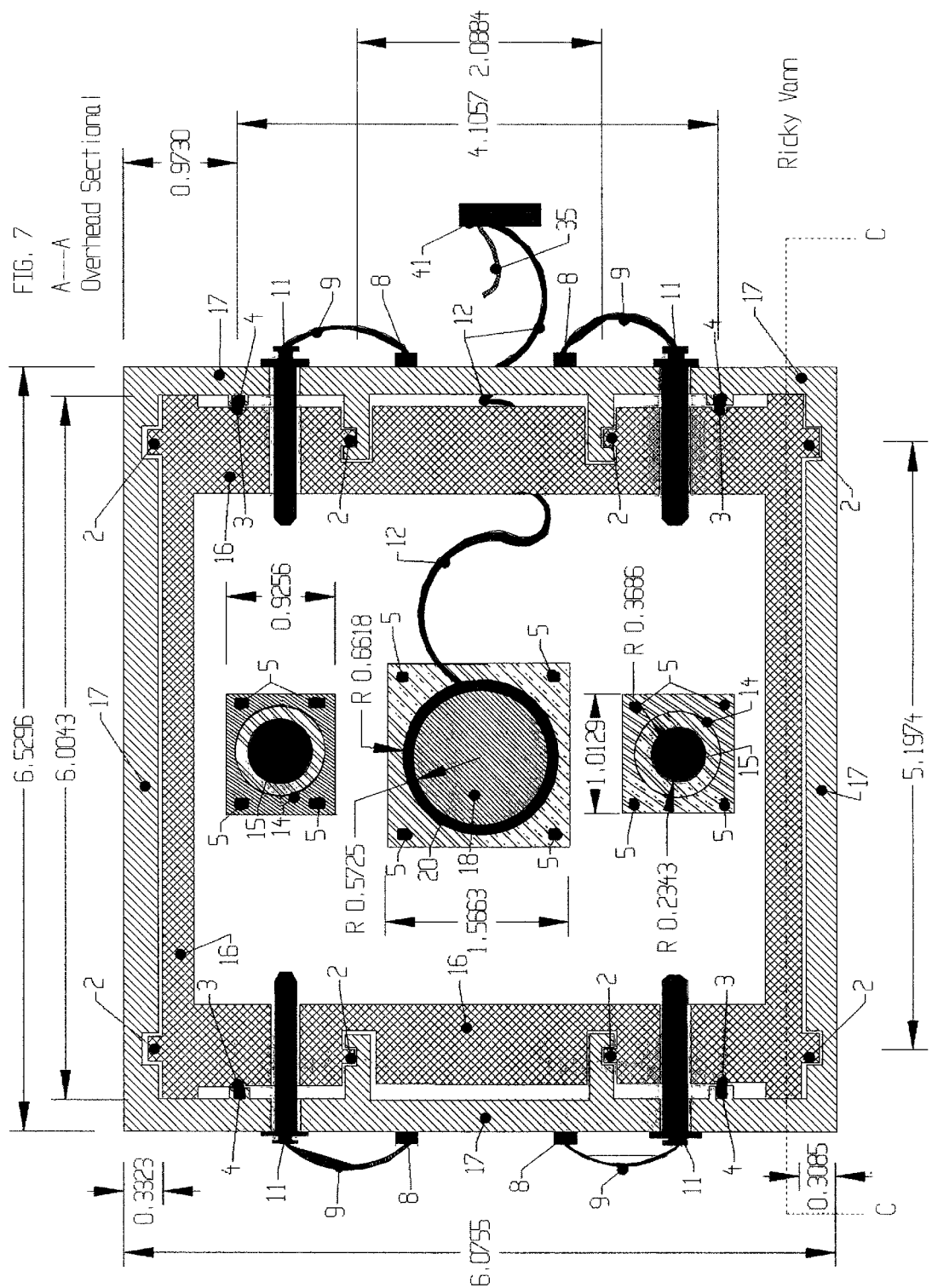

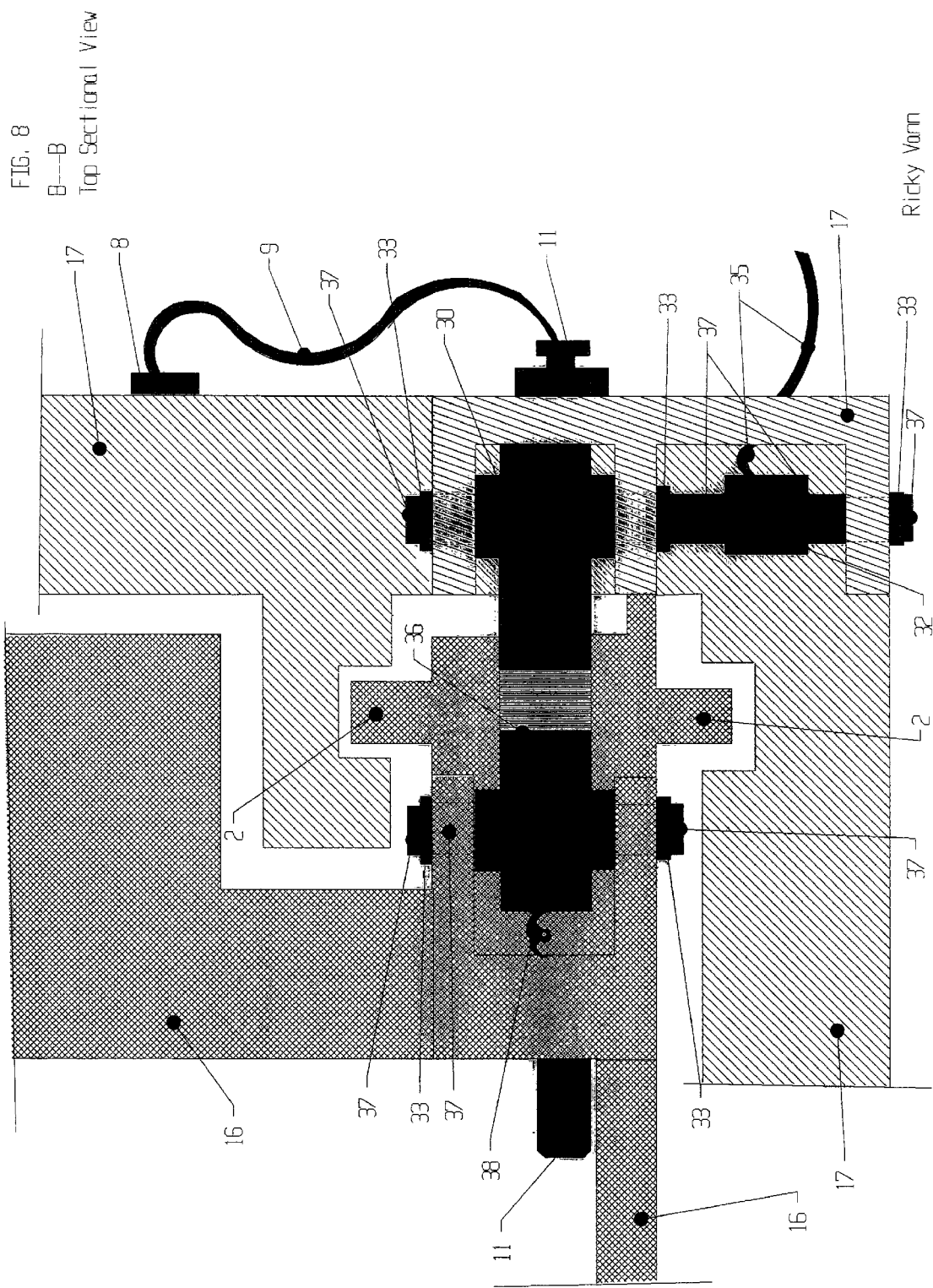

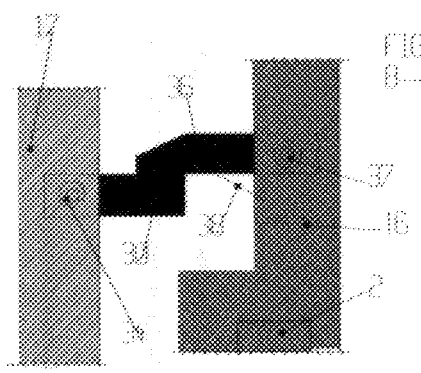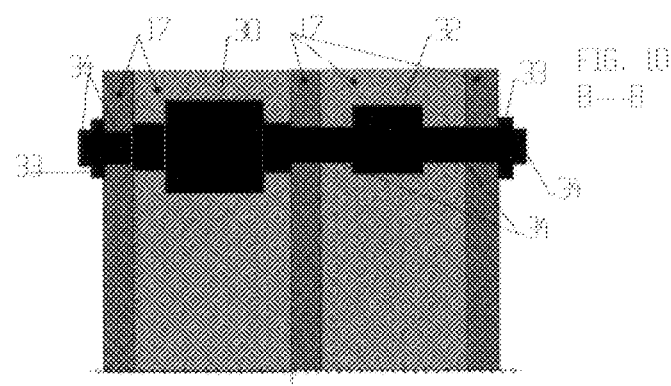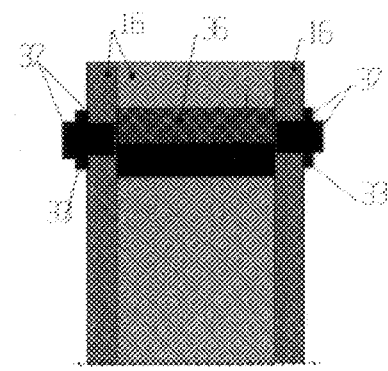

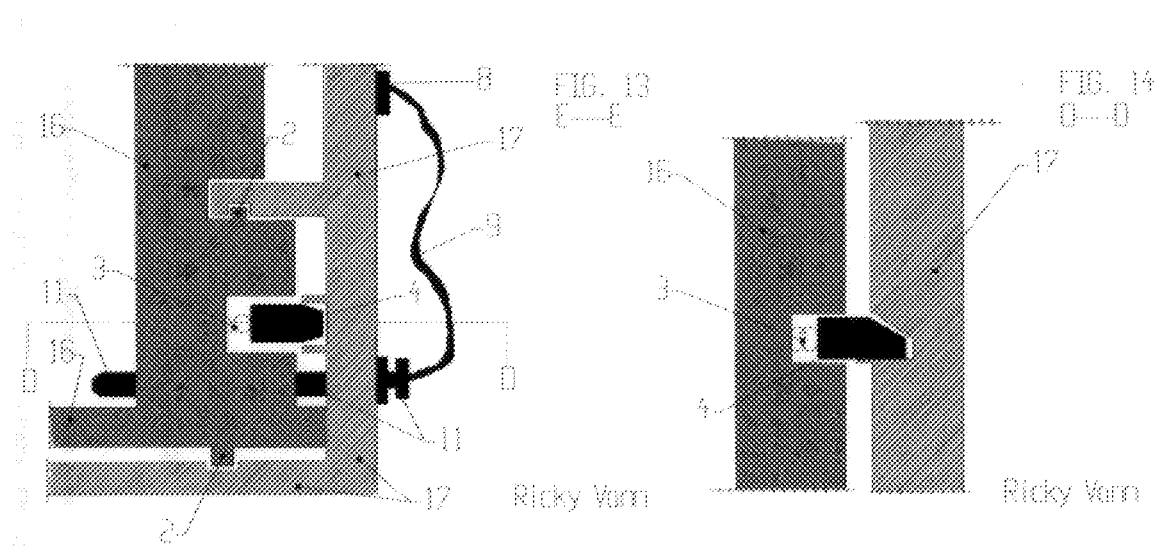

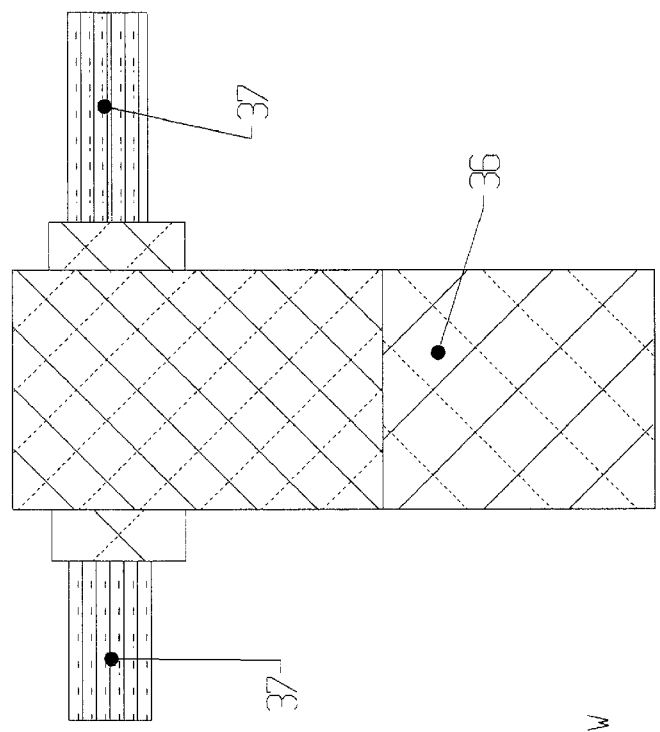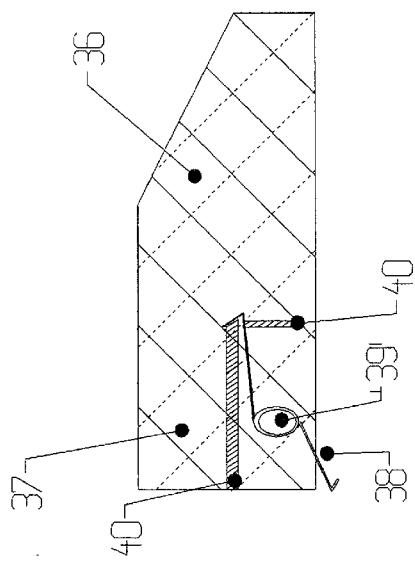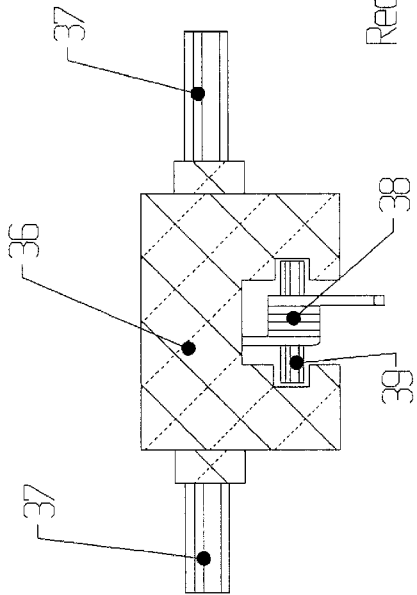
FIG. 15
36 of
FIG. 8

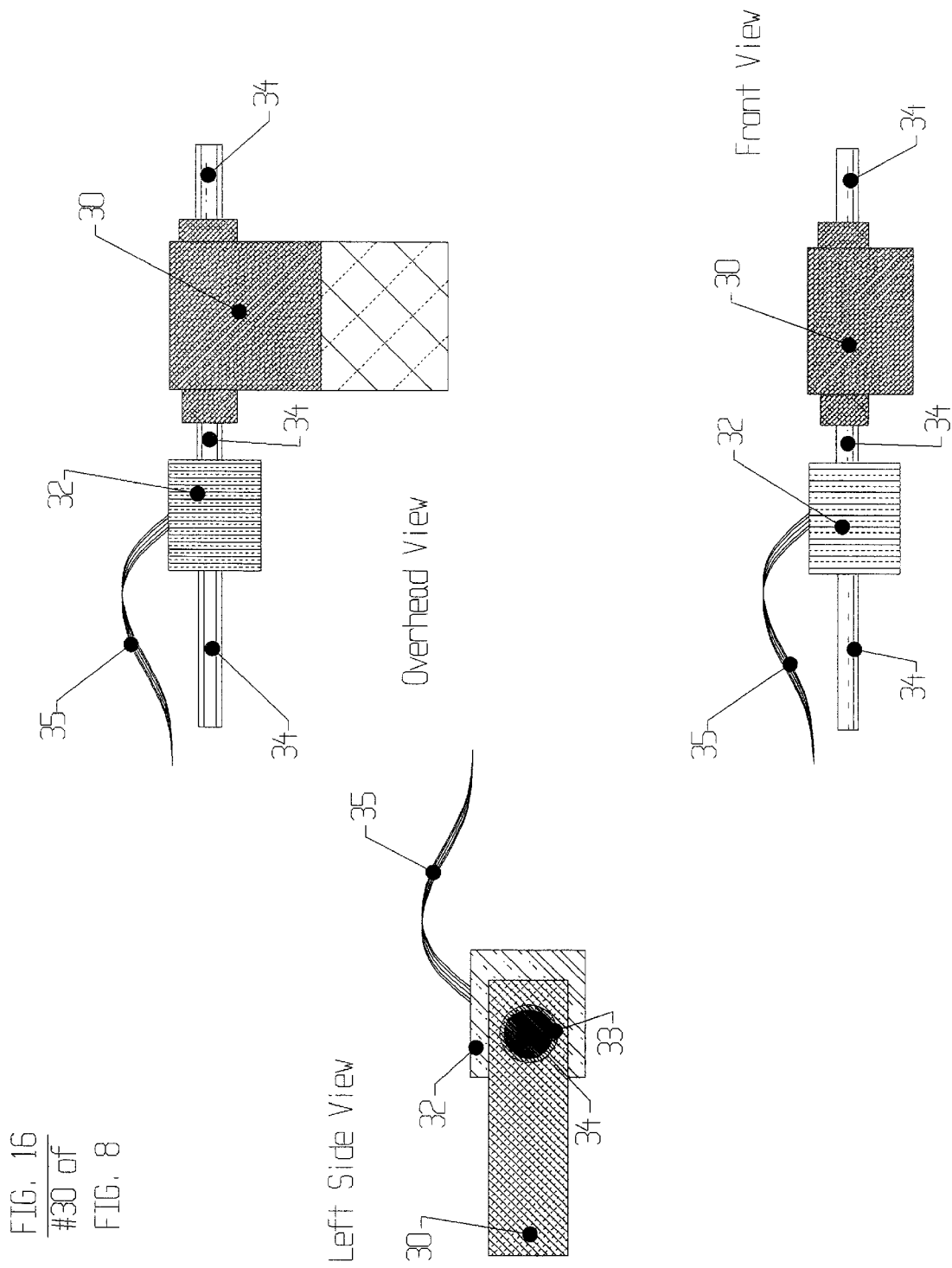

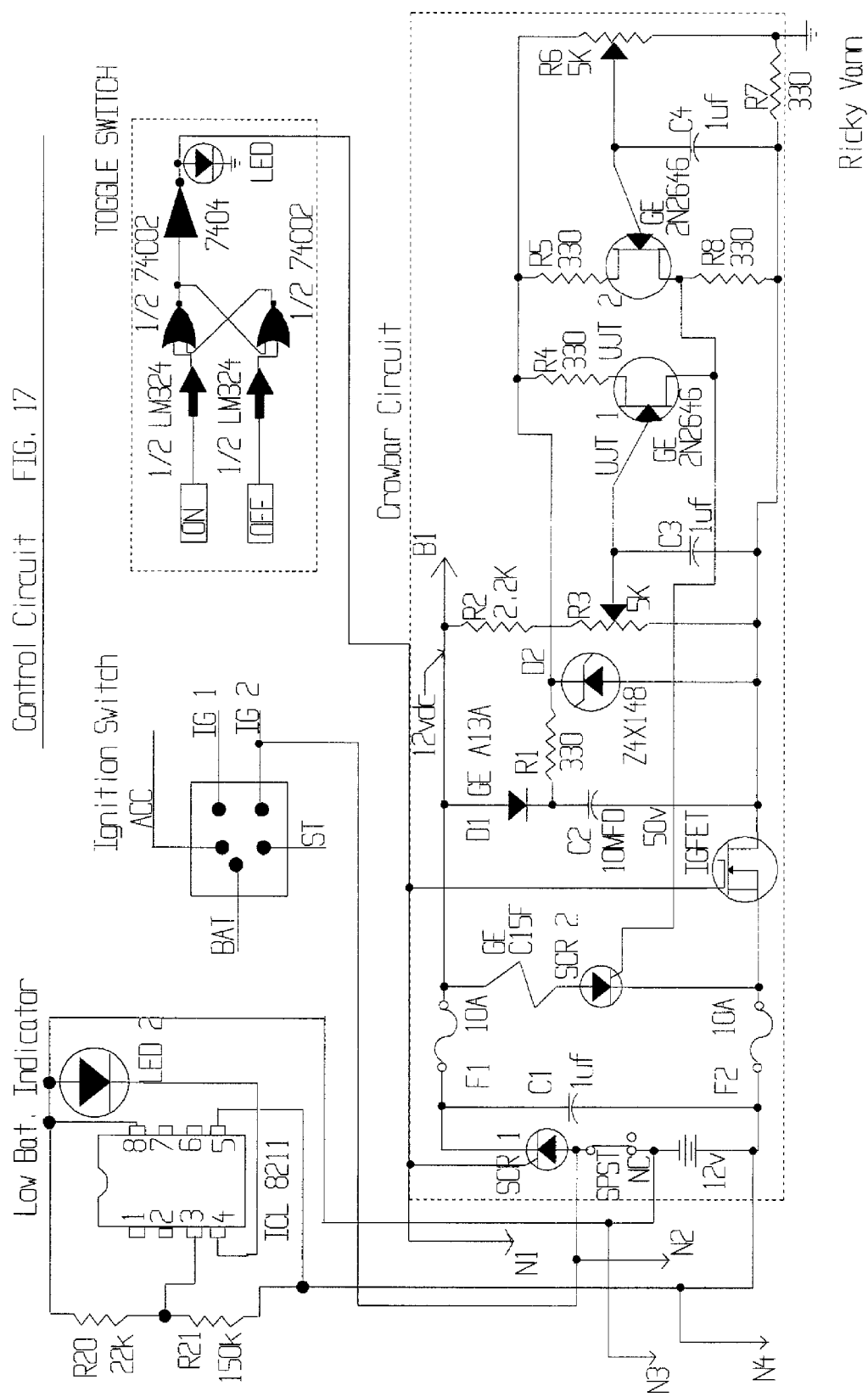

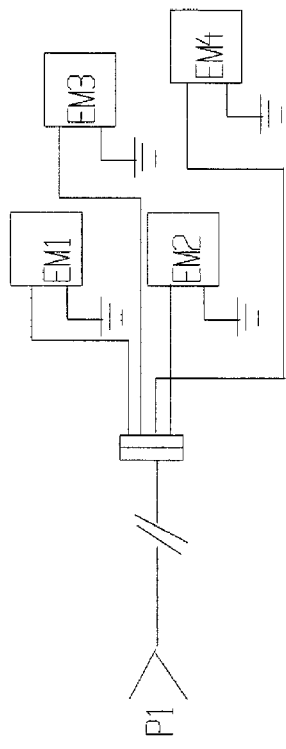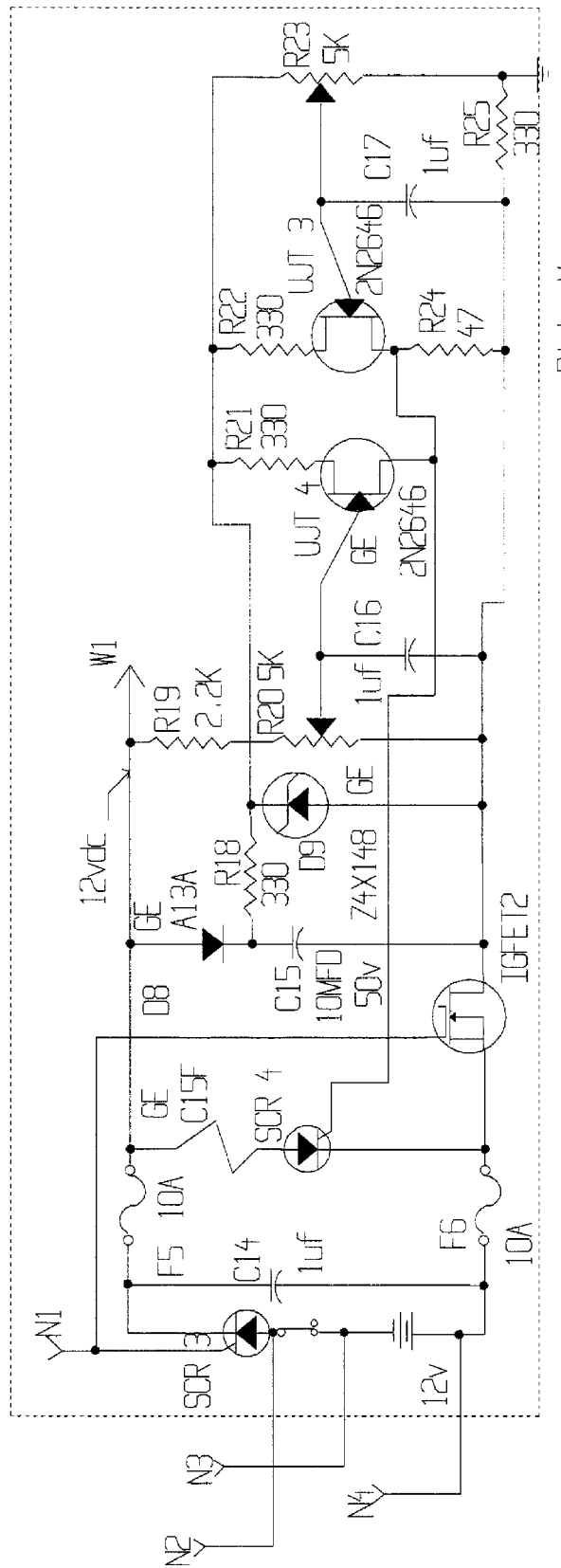
FIG. 19

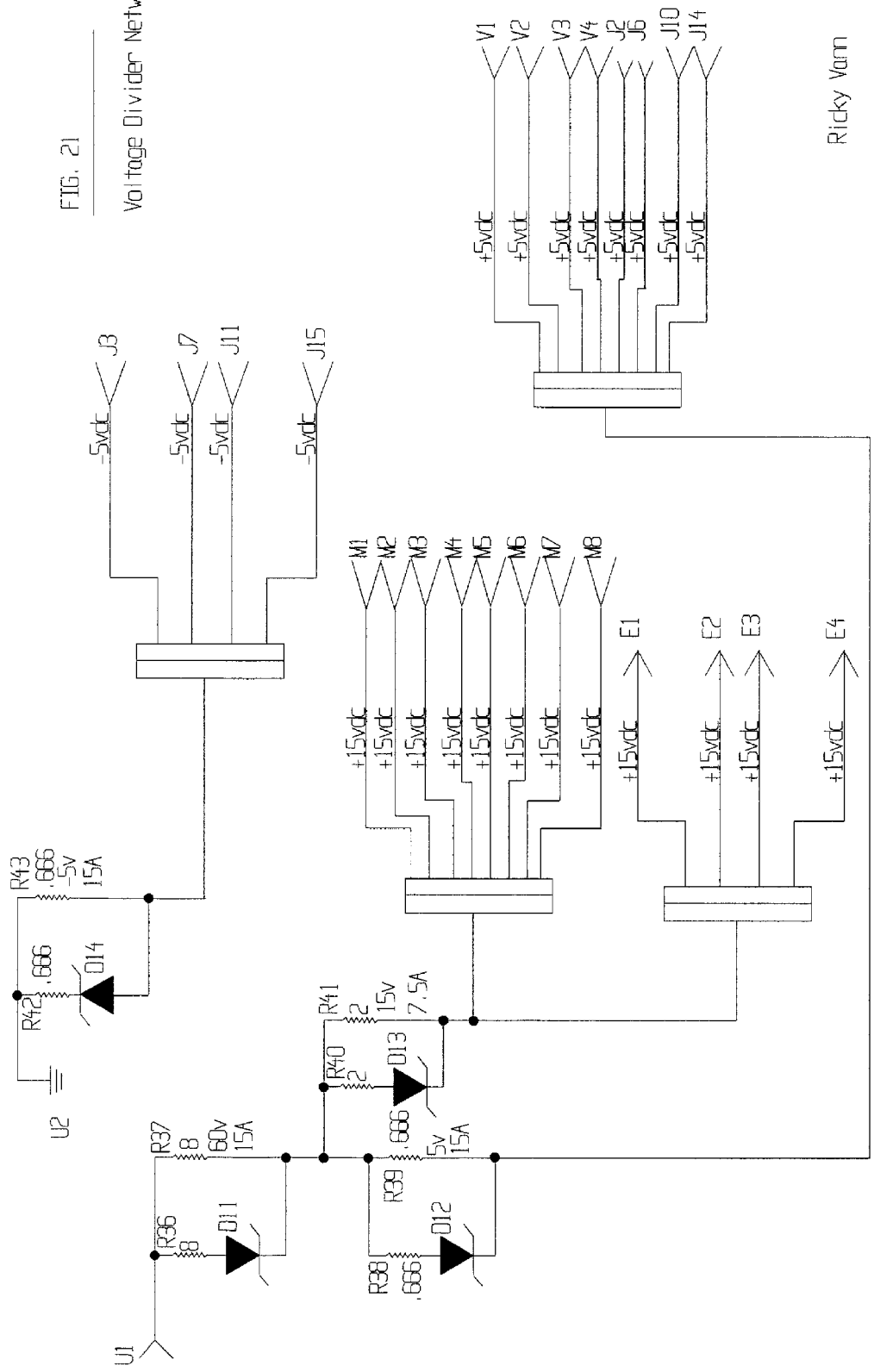

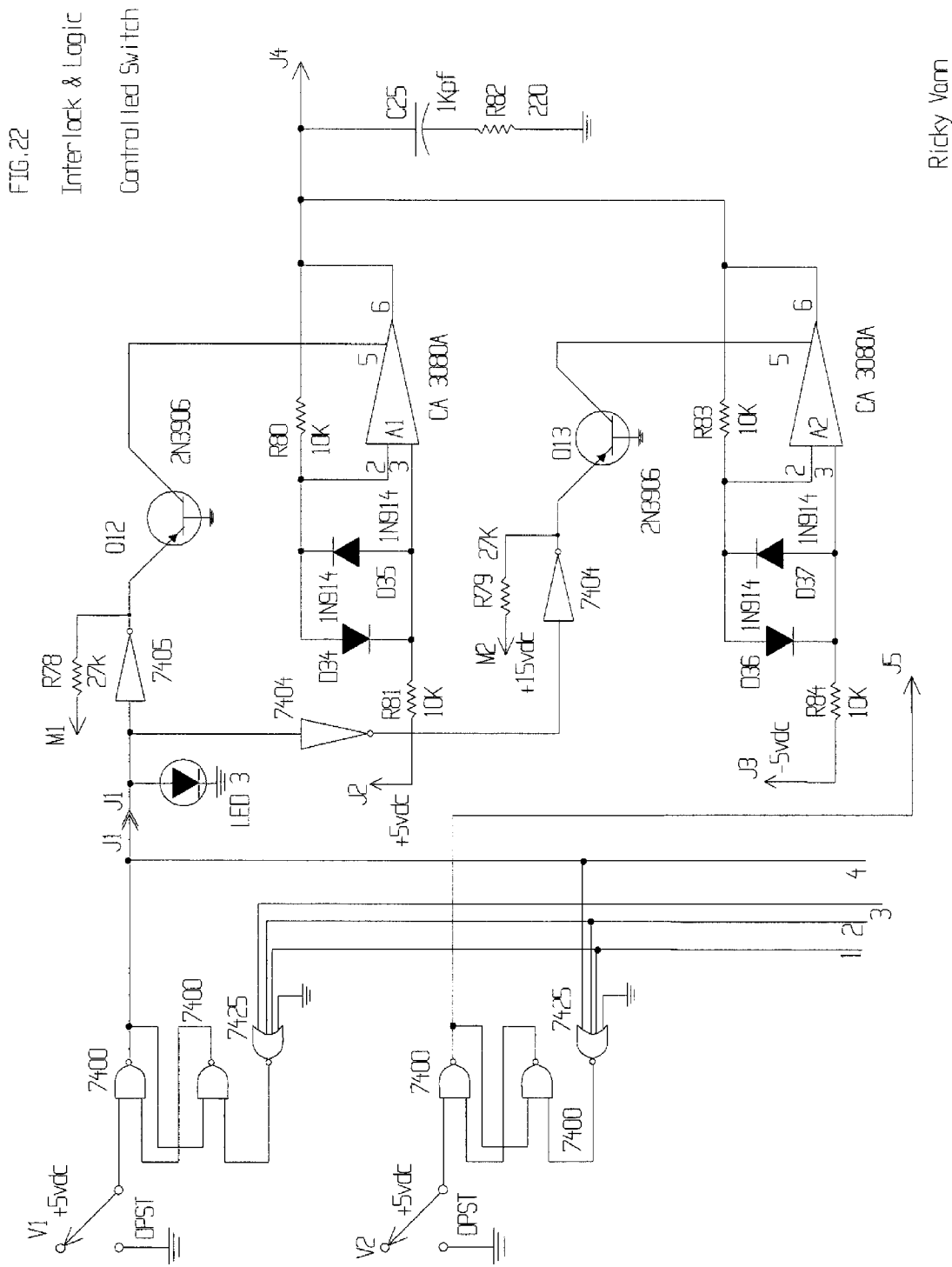
FIG. 22 Interlock & Logic Controlled Switch

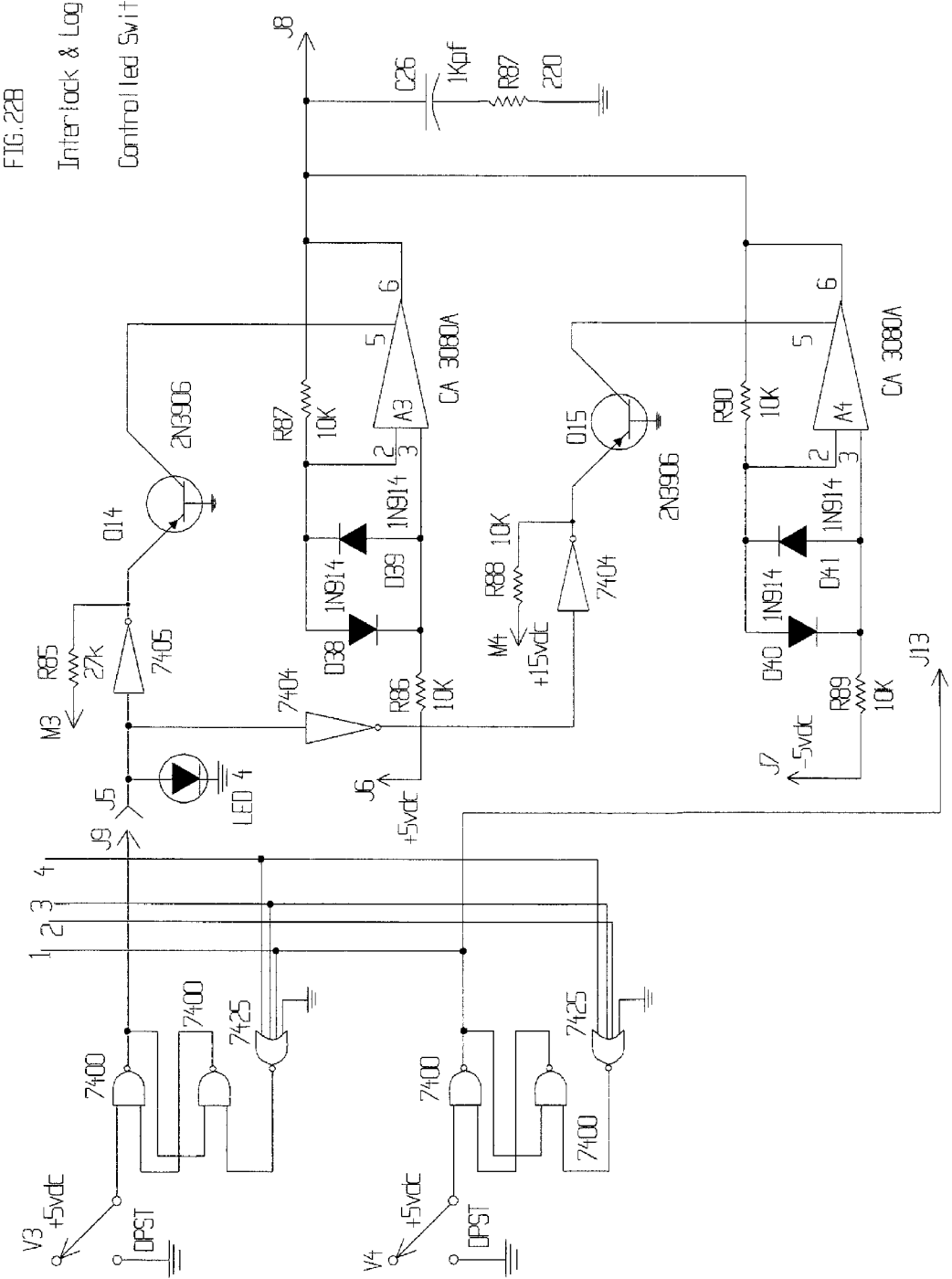

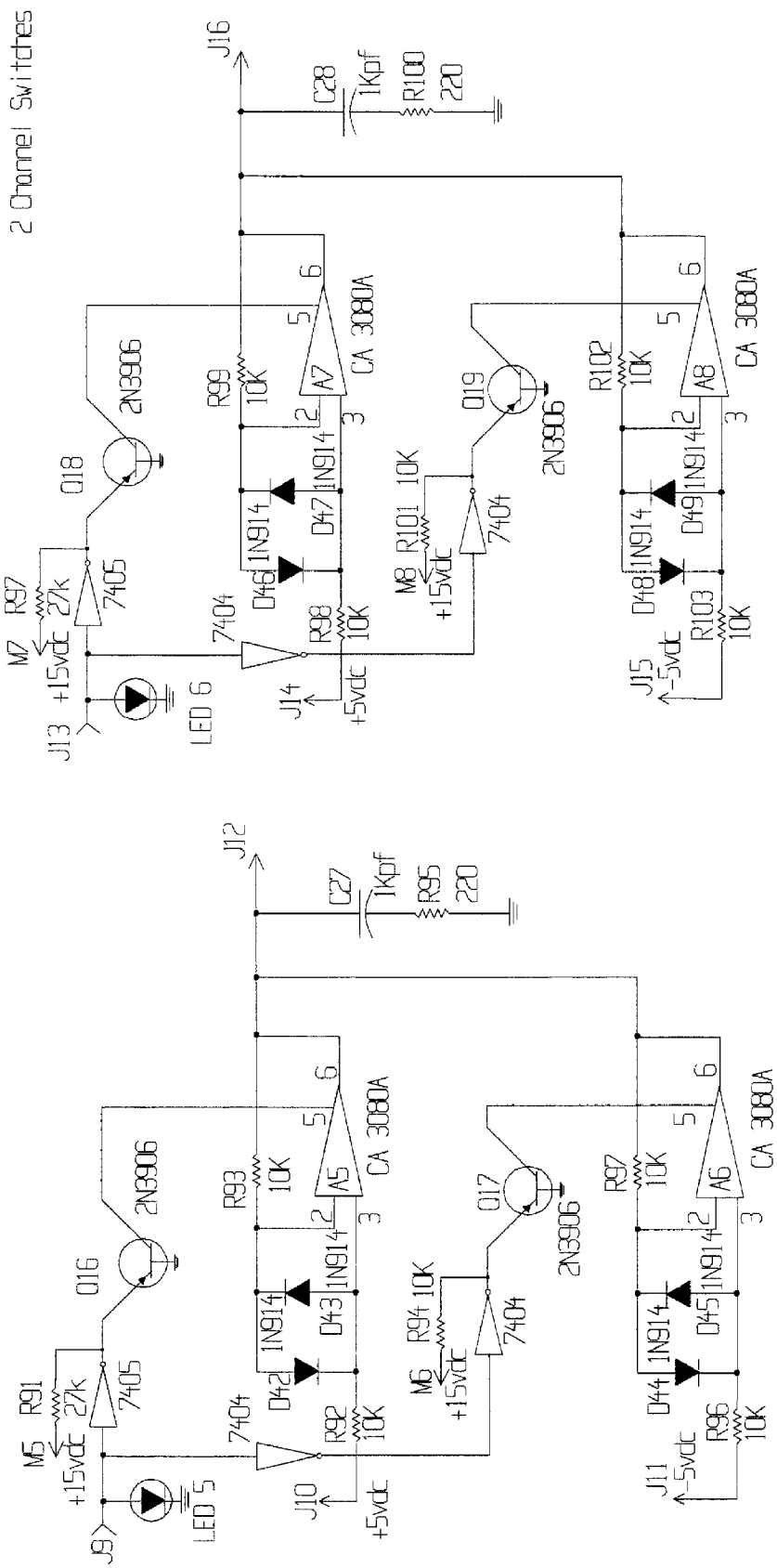

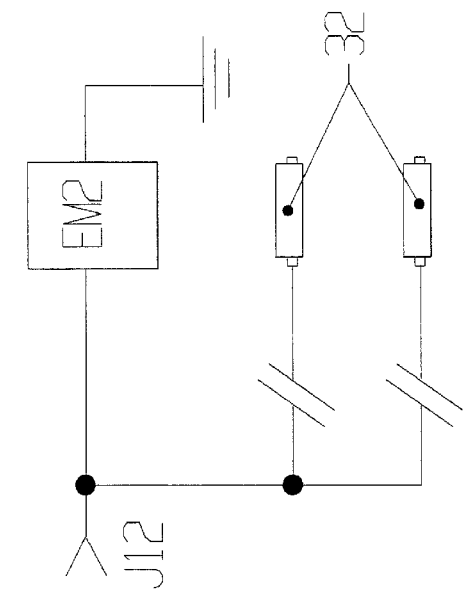
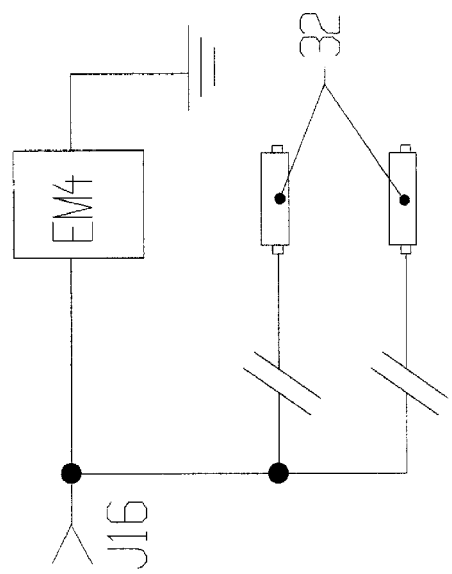
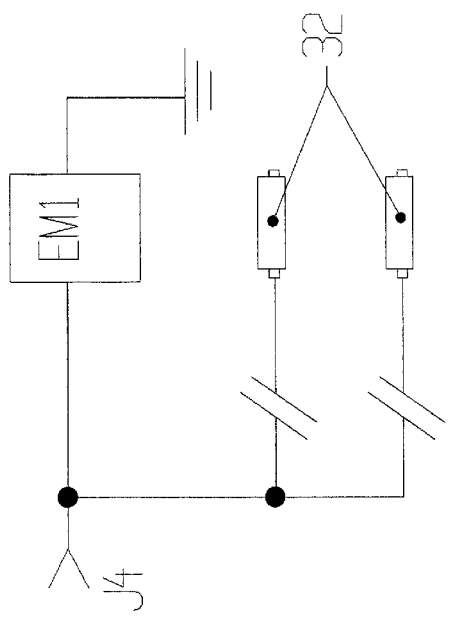
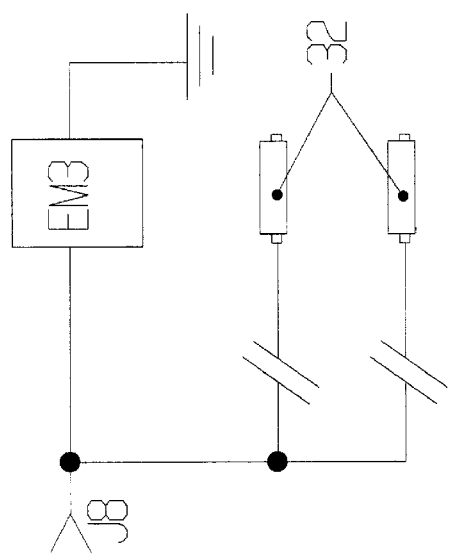
FIG. 23

ELECTROMAGNETIC LIFT APPARATUS

BACKGROUND OF THE INVENTION

1. Field of the Invention

The present invention relates to new and useful improvements in load lifting jacks, and has particular reference to electromagnetic jacks.

2. Description of the Prior Art

The use of lifting jacks is known in the prior arts. More specifically, lifting jacks heretofore devised and utilized for the purpose of raising a vehicle are known to consists basically of familiar, expected and obvious structural configurations, notwithstanding the myriad of designs encompassed by the crowded prior art which have been developed for the fulfillment of countless objectives and requirements.

For example, an electrically operated retractable jack disclosed in U.S. Pat. No. 4,067,543 which is particularly suited for leveling a vehicle such as a recreational vehicle. The jack is automatically retractable from a vertical position into a horizontal storage position under the vehicle. The jack may be operated individually or a plurality of jacks may be used in leveling the corners of the vehicle. The jacks may be raised and lowered by control switches mounted inside the vehicle without the need of the operator getting outside of the vehicle.

U.S. Pat. No. 3,984,082 discloses a self-stowing jack in which a pair of elongated axially telescoping members are arranged to be driven lengthwise relative to each other to lift the associated vehicle to which they are attached, and when retracted, to move into a self-stowing position. The telescoping members are pivoted at one end to the vehicle to be lifted or leveled, and automated latches are arranged for latching the telescoping jack members in both the stowed and lifting positions.

Another patent of interest is U.S. Pat. No. 4,434,968 which discloses a magnetic jack comprising a body consisting of a series of slidably telescoped sections expandable along the jack axis, and a pair of electromagnets disposed between each successive pair of sections, each connected to one section, and having confronting poles of like polarity, so that they repel each other when electric current is supplied thereto, in order to extend the sections along the jack axis. The magnet pairs between successive pairs of body sections may be energized selectively, or the energizing current may be variably adjusted, in order to vary the height and force of the lift provided by the jack.

While these devices fulfill their respective, particular objectives and requirements, the aforementioned patents do not disclose a vehicle jack system attachable to a vehicle which includes internal and external locking devices for both extended and retracted modes located within the jack for safety means. Also, none of the known prior art lifting jacks teach or suggest a vehicle mounted electromagnetic jack with vehicle ignition switch connections for prevention of activation of said jacks while the vehicle is in any motion gear. Furthermore, none of the aforementioned patents teach or suggest mitigation of electromagnetic radiation interference of vehicle electronic components that would be inherently propagated from the electromagnetic component incorporated in the electric lift apparatus.

In these respects, the vehicle mounted electromagnetic jack system according to the present invention substantially departs from the conventional concepts and designs of the prior art, and in so doing provides an apparatus primarily developed for the purpose of selectively lifting corners of an associated vehicle.

SUMMARY OF THE INVENTION

In view of the foregoing disadvantages inherent in the known types of lifting jacks now present in the prior art, the present invention provides a new vehicle mounted electromagnetic jack system construction wherein the same can be utilized for selectively lifting corners of an associated vehicle. As such, the general purpose of the present invention, which will be described subsequently in greater detail, is to provide a new vehicle mounted electromagnetic jack system apparatus which has many of the advantages of the lifting jacks mentioned heretofore and many novel features that result in a vehicle mounted electromagnetic jack system which is not anticipated, rendered obvious, suggested, or even implied by any of the prior art lifting jacks, either alone or in any combination thereof.

To attain this, the present invention generally comprises a vehicle jack system attachable to vehicle for lifting portions of the vehicle or the total vehicle itself. The system includes a pair of electromagnets proportionately spaced wherein the lifting force is provided by the coupling intensity of the magnetic flux field propagated from each electromagnet, having confronting poles of like polarity, wherein the well-known repelling effect between like magnetic poles urges said poles apart to furnish the lifting force. Current controlled by the Control Panel, located within the vehicle, reverses the current to the lower electromagnet causing a 180 degree phase shift in accompanying magnetic flux field, which results in confronting poles of unlike polarity, wherein the well-known attraction effect between unlike poles urges said poles together to furnish the retraction of the electromagnetic jack.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in it's application to the details of construction and to the arrangement of the components set forth in the following description or illustrated in the drawing. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent construction insofar as they do not depart from the spirit and scope of the present invention.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new vehicle mounted electromagnetic jack system apparatus which has many of the advantages of the lifting jacks mentioned heretofore and many novel features that result in a vehicle mounted electromagnetic jack system that is not anticipated, rendered obvious, suggested, or even implied by any of the prior art lifting jacks, either alone, or in any combination thereof.

It is another object of the present invention to provide a new vehicle mounted electromagnetic jack system which may be easily and efficiently manufactured and marketed.

It is a further object of the present invention to provide a new vehicle mounted electromagnetic jack system which is electromagnetic compatible (EMC) with the ambient electronic and electromagnetic environment.

It is a still further object of the present invention to provide a new vehicle mounted electromagnetic jack system which is of a durable and reliable construction.

An even further object of the present invention is to provide a new vehicle mounted electromagnetic jack system which is susceptible of a low cost of manufacture with regard to both materials and labor, and which accordingly is then susceptible of low prices of sale to the consuming public, thereby making such vehicle mounted electromagnetic jack system economically available to the buying public.

Still yet, another object of the present invention is to provide a new vehicle mounted electromagnetic jack system which provides in the apparatuses and methods of the prior arts some of the advantages thereof, while simultaneously overcoming some of the disadvantages normally associated therewith.

Still, another object of the present invention is to provide a new vehicle mounted electromagnetic jack system attachable to a vehicle for lifting the corners of the associated vehicle.

Yet, another object of the present invention is to provide a new vehicle mounted electromagnetic jack system that attenuates spurious magnetic flux coupling due to parasitic components.

Even still, another object of the present invention is to provide a new vehicle mounted electromagnetic jack system that is able to function compatibly with other electronic systems and not produce or be susceptible to interference.

Still yet, another object of the present invention is to provide a new vehicle mounted electromagnetic jack system which includes an internal and external locking device for both extended and retracted modes, located within the jack system for safety means.

And an even further object of the present invention is to provide a new vehicle mounted electromagnetic jack system which includes connections to the vehicle ignition switch to prevent operation of said jack system while the vehicle is in any motion gear.

Even still yet, another object of the present invention is to provide a new vehicle mounted electromagnetic jack system which includes a frame which comprises a configuration of guide and spring-loaded guide shaft for smooth lifting and lowering of connecting body sections.

And also yet, another object of the present invention is to provide a new vehicle mounted electromagnetic jack system which includes inner body rib sections within its frame to facilitate still further smooth lifting and lowering of connecting body sections.

And yet, another object of the present invention is to provide a new vehicle mounted electromagnetic jack system which includes dual power supplies, one for the upper electromagnet and the other for the lower electromagnet.

These together with other objects of the invention, along with the various features of novelty which characterizes the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof Such description makes reference to the annexed drawings wherein:

FIG. 1 is a front elevational view of an electromagnetic jack embodying the present invention.

FIG. 2 is a right side elevational view of an electromagnetic jack embodying the present invention.

FIG. 3 is a left side elevational view of an electromagnetic jack embodying the present invention.

FIG. 4 is a rear elevational view of an electromagnetic jack embodying the present invention.

FIG. 5 is a sectional view taken on line C—C of FIG. 7.

FIG. 6 is a sectional view taken on line C—C of FIG. 7, showing the body section extended.

FIG. 7 is a sectional view taken on line A—A of FIG. 1.

FIG. 8 is an enlarged fragmentary sectional overview taken on line B—B of FIG. 5.

FIG. 9 is an enlarged, fragmentary, side sectional view taken on line B—B of FIG. 5 showing the position of numbers 30 and 36.

FIG. 10 is an enlarged, fragmentary, front sectional view taken on line B—B of FIG. 5 of numbers 30 and 32.

FIG. 11 is an enlarged, fragmentary, front sectional view taken on line B—B of FIG. 5 of number 36.

FIG. 13 is an enlarged, fragmentary, sectional view taken on line E—E of FIG. 5.

FIG. 14 is an enlarged, fragmentary, sectional view taken on line D—D of FIG. 13.

FIG. 15 is a collage of enlarged, sectional views of #36 of FIG. 8.

FIG. 16 is a collage of enlarged, sectional views of #30 of FIG. 8.

FIG. 17 is a wiring diagram of the Control Circuit, encompassing the Toggle Switch, Crowbar Circuit, Low Battery Indicator and Vehicle Ignition Switch.

FIG. 19 is a wiring diagram encompassing the Upper Electromagnets and the Secondary Crowbar Circuit.

FIG. 21 is a wiring diagram encompassing the Voltage Divider Network.

FIG. 22 is a wiring diagram encompassing two of the four circuits of the Interlocking Bounce-free Circuit and one of the four Logic Controlled Switch Circuit.

FIG. 22B is a wiring diagram encompassing the final two of four circuits of the Interlocking Bounce-free Circuit and the second of four Logic Controlled Switch Circuits.

FIG. 22C is a wiring diagram encompassing the final two of four Logic Controlled Switch Circuits.

FIG. 23 is a wiring diagram encompassing the Lower Electromagnets.

DESCRIPTION OF THE PREFERRED EMBODIMENT

Figure 18:
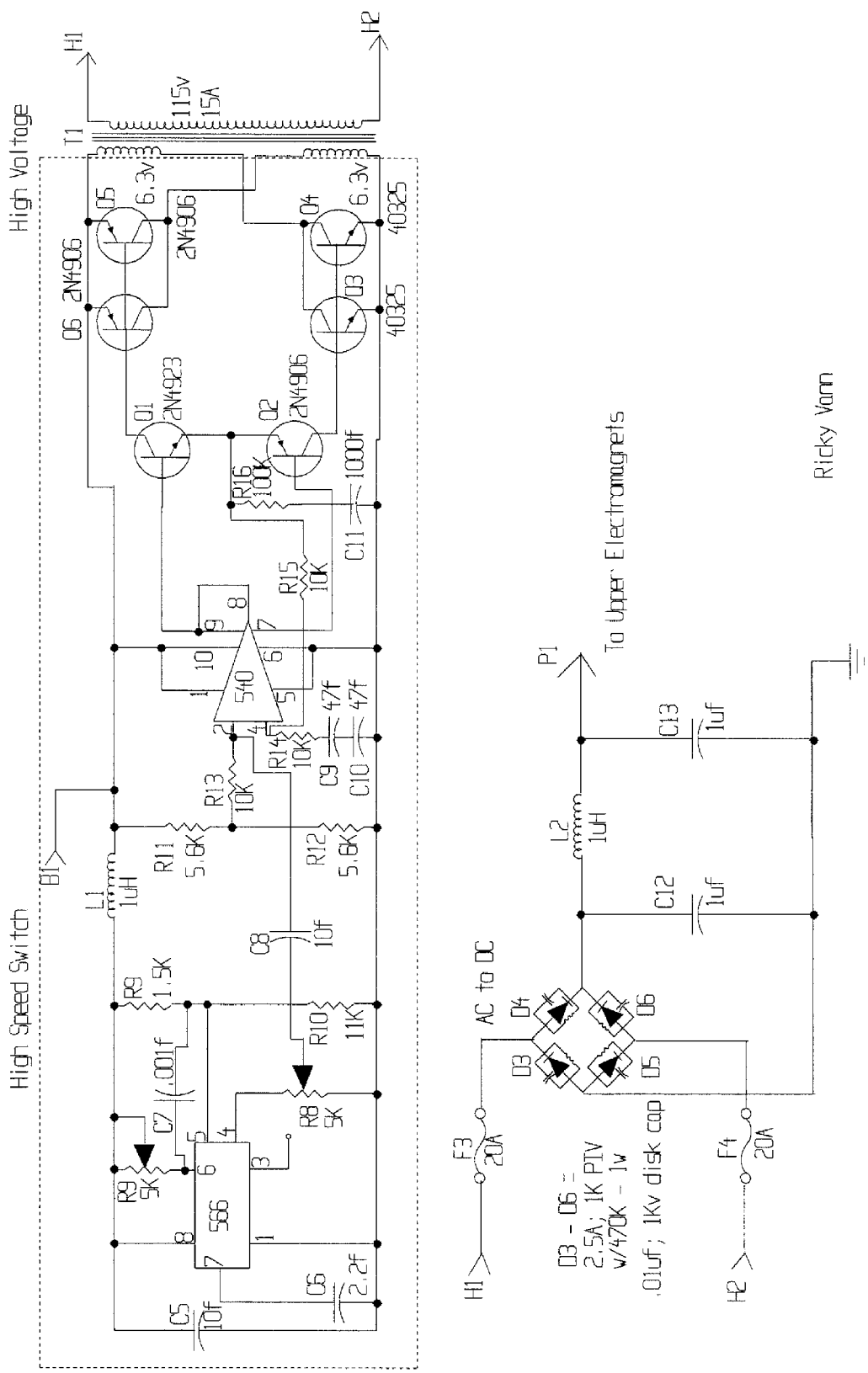
FIG. 18 is a wiring diagram encompassing the High Speed Switch, High Voltage Transformer, AC to DC Bridge Circuit and DC Filter Circuit.

Like reference numerals apply to similar parts throughout the several views, and the numeral 17 applies generally to the outerbody section of the jack. Said jack outerbody section is generally rectangular in construction, forged of aluminum impregnated with carbon for radio frequency absorption to reduce reflections of electromagnetic energy. Said outerbody section 17 consists of a soft iron, magnetic conductive material 19, cylindrical in shape, encircled with AWG (B&S) No. 14 wiring 20, which receives electric current through conductor 13. Said soft iron material 19, cylindrical in shape, which is encircled with wiring 20, has a rectangular flange as its top thru which four bolts 5 attaches it to outerbody section 17, as shown in FIGS. 5 and 6. This arrangement, 19 and 20 together, is the Upper Electromagnet.

The numeral 16 applies generally to the innerbody section of the jack. Said innerbody section is generally rectangular in construction, forged of aluminum impregnated with carbon for radio frequency absorption to reduce reflections of electromagnetic energy. Said innerbody section 16 consists of a soft iron, magnetic conductive material 18, cylindrical in shape, encircled with AWG (B&G) No. 14 wiring 20, which receives electric current through conductor 12. Said soft iron material 18, cylindrical in shape, which is encircled with wiring 20, has a rectangular flange as its bottom, as shown in FIG. 7, thru which four bolts 5 attaches it to the floor of innerbody section 16, as shown in FIGS. 5 and 6. This arrangement, 18 and 20 together, is the Lower Electromagnet.

Relative movement of the pair of body sections during either extension or retraction thereof is rendered smooth and gradual, as compared to the quick "snap" action which would otherwise result from simply making or breaking the electric current to the related pairs of magnets, by means of a dashpot arrangement consisting of a pair of vertical plungers 15 affixed to the top of the outerbody section 17 with four bolts 5 thru their respective rectangular flange, as shown in FIGS. 5 and 6, and moveable in a pair of coaxial socket members 14 affixed to the floor of innerbody section 16 with four bolts 5 thru their respective rectangular flange, as shown in FIGS. 5, 6 and 7 in the manner of a pair of pistons. The socket members 14 are sealed except for a small air hole 7 near the bottom. Thus the plungers may move in the sockets only as fast as allowed by the entry and exit of air to or from the sockets through said air holes 7, and this speed may be predetermined by proper selection of the diameter of said air hole 7.

Relative movement of the pair of body sections during extension thereof, is rendered smooth, gradual and uniform of action, as compared to tremulant, which would otherwise result from the tendency of confronting like magnetic poles to veer right or left of each other, by means of the configuration of innerbody rib section 2 and outerbody rib section guide, as shown in FIGS. 7 and 8.

The cessation of downward movement of innerbody section 16 is rendered steadfast by means of the configuration of the innerbody section spring-loaded shaft 36, and the outerbody section locking shaft 30, as shown in FIGS. 8 and 9. The outerbody section locking shaft 30 is rendered operable by means of a small, reversible, DC shaded pole motor 32, as shown in FIGS. 8, 10 and 16.

Through connector 41, current of a positive nature is simultaneously received by the lower electromagnet, 18 and 20 together, and the DC motor 32, causing a 180 degreee phase shift in the accompanying magnetic flux field, resulting in the confronting pole of the Lower Electromagnet, 18 and 20 together, to be of like polarity with the confronting pole of the Upper Electromagnet, 19 and 20 together, giving the well-known repellent action, while simultaneously causing the outerbody section locking shaft 30 to pivot downward, parallel with the vertical wall of the outerbody section 17, allowing procedural action of the repelling confronting poles of the electromagnets. When current of a negative nature is received through conductor 41, the phase shift in the accompanying magnetic flux field is reversed 180 degrees, resulting in a reversal of the confronting pole of the Lower Electromagnet, 18 and 20 together, giving the well-known attraction action, while causing a 180 degree phase shift in the current to the DC motor 32, resulting in the pivoting of the outerbody section locking shaft 30 to a horizontal position, perpendicular to the vertical wall of outerbody section 17.

As the innerbody section 16 is drawn upward by means of the attraction of the unlike confronting poles of the electromagnets, the outerbody section locking shaft 30 is contacted by the innerbody section spring-loaded shaft 36, which is forced downward, parallel to the vertical wall of innerbody section 16, by means of the compression of spring 38, compression spring 38 is shown in FIG. 9, thus providing an effectual internal locking device of the present invention while said invention is in its retracted mode.

Referring to the Toggle Switch of wiring diagram FIG. 17, it will be seen that excitation of the circuit is initiated by touching the 0.5 inch square copper clad pattern marked "ON" on the printed circuit board, which will give a high output. Touching the other plate marked "OFF" gives a low output, effectively turning the switch off. The LED located between the output and ground shows the status of the switch.

Also, within the wiring diagram of FIG. 17, it will be seen that an Integrated Circuit, ICL 8211, with its accompanying components, is connected across the 12 vdc battery of the Crowbar Circuit. This is the Low Battery Indicator. Due to the value of resisters R20 and R21 the low trip voltage is 9 vdc, at which voltage LED 2 emits light, indicating that the voltage is low.

The Crowbar Circuit of wiring diagram FIG. 17 protects DC circuits from over-voltage or over-current conditions. To protect from excessive voltage, SCR 2 closes in a few microseconds after triggering, providing a current path through the coil of circuit breaker C15F, tripping the circuit breaker. A potentiometer, R3, sets the voltage trip for the DC supply. If the DC supply voltage exceeds that set amount, 12 vdc, the voltage at the emitter of UJT 1 goes past its peak-point voltage and UJT 1 fires. When UJT 1 fires, a trigger pulse is generated across R8. The trigger fires SCR 2. SCR 2 provides a current path through the circuit breaker's coil, C15F, popping the breaker. Aside from the action of UJT 1 and SCR 2 speeding the circuit breaker response, the action of UJT 1 and SCR 2 also shunts excessive current, preventing the voltage across the High Speed Switch, shown in wiring diagram FIG. 18, from rising until the breaker, C15F, opens. The action of UJT 2 and SCR 2 protects the High Speed Switch, shown in wiring diagram FIG. 18, and power supply against short-circuit conditions by monitoring the load current flowing through resister R7. When the voltage across resistor R7 goes past 12 vdc, set by potentiometer R6, the voltage at the emitter of UJT 2 exceeds the peak-point voltage. This causes UJT 2 to fire, which fires SCR 2. False triggering of the circuit is prevented by the combined action of rectifier D1 and capacitor C2. The filtering action excludes negative voltage transients. C3 provides filtering for UJT 1, and C4 provides filtering for UJT 2.

Referring to the Vehicle Ignition Switch in wiring diagram FIG. 17, it will be seen that the said Vehicle Ignition Switch is connected in series with the Single-Pole-Single-Throw Normally Closed Switch within the Crowbar Circuit. Current received from the Vehicle's Ignition Switch opens the normally closed switch, which in turn opens the circuit preventing current to flow through the Crowbar Circuit. Once this current is removed, the circuit is again closed as the Single-Pole-Single-Throw inline switch reverts back to its naturally closed state.

Referring to the High Speed Switch circuit of FIG. 18, it will be seen that the 566 function generator of the High Speed Switch circuit provides a triangle output at 60 Hz with frequency stability better than ±0.02% 1° C. The 540 Power Driver feeds six transistor power output stage. The 566 also provides a square wave output for other purposes.

The T1 Stancor TP3 Transformer of FIG. 18 attenuates the third harmonic, giving an output very close to pure 60 Hz sinewave.

Referring again to the wiring diagram of FIG. 18, it will be seen that the Full-Wave Bridge Rectifier circuit provides an accurate full-wave rectification of the input signal received from transformer T1, with distortion below 5% up to 10 kHz. Reversal of all diode polarities reverses polarity of the output. Output impedance is low for both input polarities, and errors are small at all signal levels.

The combination of capacitor C12, inductor L2 and capacitor C13 of wiring diagram FIG. 18, form the Pi ($\pi$) filter network used to improve the filtering action of the rectified current and voltage received from the Bridge Rectifier of wiring diagram FIG. 18. The input capacitor C12, acts to bypass the greatest portion of the ripple component to ground. The series choke inductor L2, serves to maintain the current at a nearly constant level during the charging and discharging cycles of input capacitor C12. The other capacitor C13, acts to bypass the residual fluctuations existing after filtering by the input capacitor C12 and inductor L2.

Referring to wiring diagram FIG. 19, it will be seen that the Upper Electromagnets, EM1, EM2, EM3 and EM4, receive current through connector P1.

The secondary Crowbar Circuit of wiring diagram FIG. 19 serves the purpose of over-voltage and over-current protection for the Lower Electromagnet DC circuits. It will be seen that connections are made to the Toggle Switch of wiring diagram FIG. 17 through connector N1. Connection to the Vehicle Ignition Switch of wiring diagram FIG. 17 through connector N2, and connections to the Low Battery Indicator of wiring diagram FIG. 17 through connectors N3 and N4. Through connector N1 the circuit is simultaneously activated with the Primary Crowbar Circuit of wiring diagram FIG. 17, from the Toggle Switch of wiring diagram FIG. 17. Safety deactivation is provided through connector N2 as it receives current from the Vehicle Ignition Switch of wiring diagram FIG. 17, causing the Single-Pole-Single-Throw inline switch to open, breaking the circuit. Removal of the current from the Vehicle Ignition Switch allows the Single-Pole-Single-Throw inline switch to revert back to its naturally closed state, allowing current to flow through the Crowbar Circuit.

Figure 20:
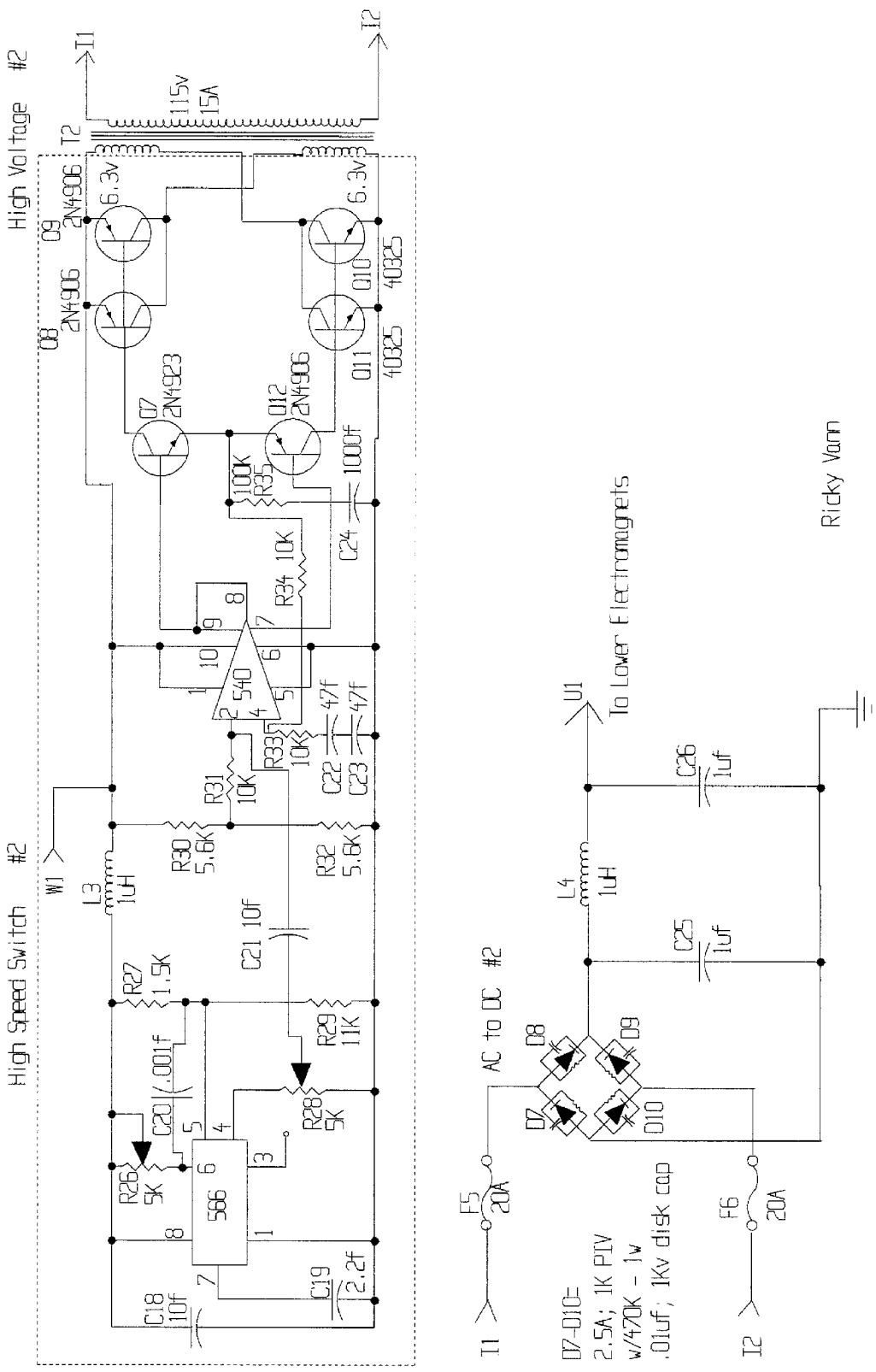
FIG. 20 is a wiring diagram encompassing the secondary High Speed Switch, secondary High Voltage Transformer, secondary AC to DC Bridge Circuit and secondary DC Filter Circuit.

Referring to the wiring diagram of FIG. 20, it will be seen that the Secondary High Speed Switch is connected to the Secondary Crowbar Circuit of wiring diagram FIG. 19 through connector W1.

In the wiring diagram of FIG. 21, the Voltage Divider Network is shown. As can be seen, DC voltage of a positive nature is supplied to said Voltage Divider Network from the secondary Pi ($\pi$) Filter configuration of capacitor C25, inductor L4 and capacitor C26 of wiring diagram FIG. 20, through connector U1. Summarily, DC voltage of a negative nature is supplied through connector U2.

The combination of dropping resistor R36 and zener diode D11 of wiring diagram FIG. 21, form the voltage regulation for load resistor R37, holding the DC voltage at 60 vdc. Similarly, the combination of dropping resistor R38 and zener diode D12 regulates the voltage for load resistor R39, and the dropping resistor R40 and zener diode D13 regulates the voltage for load resistor R41. The combination of dropping resistor R42 and zener diode D14 form the voltage regulator for load resistor R43, holding the DC voltage at −5 vdc.

Referring to wiring diagram FIG. 22, the V1 Double-Pole-Single-Throw gate of the first Bounce-free Interlocking Circuit receives 5 vdc from the V1 connector of wiring diagram of FIG. 21. Said Bounce-free Interlocking Circuit arrangement provides low cost equivalent of mechanically interlocked switch assembly, while providing TTL compatibility and freedom from switch bounce. Momentary pressing of any push-button restores its associated RS flip-flop to normal and makes output of that channel high. Said arrangement uses cross-coupled two input nand gates for each flip-flop, connected so each actuation produces an output and resets all other flip-flops. If two or more buttons are pushed simultaneously, all their channels will go high, but only the last one released will stay on. Correspondingly, Double-throw-Single-pole gates V2 thru V4 variously receive 5 vdc voltage from corresponding V2 thru V4 connectors of wiring diagram FIG. 21.

The Two Channel Logic Controlled Switches of wiring diagrams FIGS. 22, 22B and 22C incorporate two CA3080A operational transconductance amplifiers each, which are programmed on and off alternately by control logic received from the outputs J1, J5, J9, and J13 of the Bounce-free Interlocking Switches of wiring diagrams FIGS. 22 and 22B, for multiplexing two inputs each of 5 vdc into a single output. When input control lines J1, J5, J9, and J13 of the Two Channel Logic Controlled Switches of wiring diagrams FIGS. 22, 22B and 22C are high, inputs J2, J6, J10 and J14 of wiring diagrams FIGS. 22, 22B and 22C appears at the respective outputs J4, J8, J12 and J16 of wiring diagrams FIGS. 22, 22B and 22C. For logic low, inputs J3, J7, J11 and J15 of wiring diagrams FIGS. 22, 22B and 22C appears at the respective outputs J4, J8, J12 and J16 of wiring diagrams FIGS. 22, 22B and 22C. Both channels operate at unity gain. Control logic is TTL compatible.

Referring to wiring diagram FIG. 23, it will be seen that connections to Lower Electromagnets EM1, EM2, EM3, and EM4 are through outputs J4, J8, J12 and J16 of wiring diagrams FIGS. 22, 22B and 22C.

As a further safety measure, FIG. 7 shows four steel rods 11, to be inserted through predrilled openings that extends through the outerbody section 17, through the innerbody section 16, stabilizing the jack in its extended, as well as, retracted position, as shown in FIGS. 5 and 6.

In use, the vehicle mounted electromagnetic jack system may be installed onto a vehicle by mounting a plurality of the electromagnetic jacks to selected areas of the vehicle. Preferably, four of such jacks are used, with each jack being mounted proximate a corner of the vehicle. Such arrangement allows the vehicle to be selectively leveled, elevated for service, or otherwise lifted off the ground at any time. The vehicle mounted electromagnetic jack system eliminates the need for a portable jack to be carried in the trunk of the vehicle, and allows for more convenient servicing of the vehicle, such as encountered when replacing a flat tire, removing debris from underneath the vehicle, changing the oil, the prevention of vehicle theft by elevating the drive wheels while the vehicle is parked, and other similar activities which require an elevation of the vehicle.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to falling within the scope of the invention.

What is claimed as being new and desired to be protected by Letters Patent of the United States is as follows:

1. A vehicle mounted electromagnetic jack system comprising:

an electromagnetically operated jack having inner and outer body sections;

a substantially flat base having molded neoprene padding for a firm grip of virtually any ground surface;

a group of mounting studs affixed to the top of the outerbody section, said mounting studs being securable to underside of the vehicle;

a vertical plunger moveable in a coaxial socket member, affixed to the top underside of the outerbody section and the floor of the innerbody section, for the purpose of smooth and gradual extension and retraction of body sections of the vehicle mounted electromagnetic jack system of the present invention as pertains to making or breaking the electric circuit of said jack;

a configuration of guide and shaft for smooth and gradual extension and retraction of connecting body sections of the vehicle mounted electromagnetic jack system of the present invention, as pertains to a veering to left or right of the confronting magnetic poles of like polarity;

an internal locking device which effectively locks connecting body sections of the vehicle mounted electromagnetic jack system of the present invention in the retracted position, while, but not limited to, the cessation of current to said body sections;

an external locking device which effectively locks connecting body sections of the vehicle mounted electromagnetic jack system of the present invention in either extension or retraction position, while, but not limited to, the cessation of current to said jack;

a frame which comprises a configuration of guide and rib for smooth extension or retraction of connecting body sections of the vehicle mounted electromagnetic jack system of the present invention;

a dual power supply system whereby, a primary power supply supplies current to a Upper Electromagnets, and a secondary power supply supplies current to a Lower Electromagnets, or any combination thereof, of the vehicle mounted electromagnetic jack system of the present invention;

an internal motorized locking device of, but not limited to, reversible means, whereby operation of said locking device works in conjunction with, but not limited to, the operation of the electromagnets of the vehicle mounted electromagnetic jack system of the present invention;

an innerbody wall and outerbody wall forged of carbon impregnated Aluminum for the purpose of forming a conductive enclosure which shields the vehicle mounted electromagnetic jack system of the present invention from ambient broadband electromagnetic interference;

a safety device whereby connection is made from the vehicle ignition switch to the power supply control circuit of the vehicle mounted electromagnetic jack system of the present invention, to prevent operation of said present invention while the vehicle is engaged in any motion gear.

2. A vehicle mounted electromagnetic jack system of claim 1 which comprises:

a pair of electromagnets whereby current supplied to, but not limited to, the lower electromagnet is reversible whereby the magnetic field of the confronting pole of said electromagnet may acquire a 180° phase shift of polarity as desired to achieve the extension and/or retraction of the electromagnetic jack system of the present invention.

* * * * *